United States Patent
Scheidt et al.

(10) Patent No.: US 6,490,680 B1
(45) Date of Patent: Dec. 3, 2002

(54) ACCESS CONTROL AND AUTHORIZATION SYSTEM

(75) Inventors: Edward M. Scheidt, McLean, VA (US); Ersin L. Domangue, Woodbine, MA (US)

(73) Assignee: TecSec Incorporated, Vienna, VA (US)

( * ) Notice: Subject to any disclaimer, the term of this patent is extended or adjusted under 35 U.S.C. 154(b) by 0 days.

(21) Appl. No.: 09/205,221

(22) Filed: Dec. 4, 1998

Related U.S. Application Data

(60) Provisional application No. 60/068,785, filed on Dec. 4, 1997.

(51) Int. Cl.⁷ .............................. H04L 9/00; H04L 9/30
(52) U.S. Cl. ...................... 713/166; 713/176; 713/185; 380/286
(58) Field of Search ................................ 713/159, 166, 713/176, 185; 380/277, 286

(56) References Cited

U.S. PATENT DOCUMENTS 5,499,297 A * 3/1996 Boebert ...................... 713/159
5,694,472 A * 12/1997 Jihnson et al. ............... 713/189

* cited by examiner

Primary Examiner—Gilberto Barrón
(74) Attorney, Agent, or Firm—IP Strategies, P.C.

(57) ABSTRACT

A process of encrypting an object includes applying a hash algorithm to the object, generating a random number, combining a first plurality of splits including the random number to form a working split, encrypting the object using the working split, combining a second plurality of splits not including the random number to form a value, encrypting the random number using the value, encrypting the hashed object according to a signature algorithm using a user private key, encrypting the hashed object according to a selected algorithm using the working split as a key, forming a header including information that can be used to decrypt the object, encrypting the header, and adding the encrypted header to the encrypted object. The pluralities of splits include a fixed split, a variable split, and a label split corresponding to a selected label. The header includes the encrypted random number, a label, and a digital signature.

10 Claims, 6 Drawing Sheets

ACCESS CONTROL AND AUTHORIZATION SYSTEM

CROSS-REFERENCE TO RELATED APPLICATIONS

This disclosure is related to U.S. Provisional Patent Application Serial No. 60/068,785, which was filed on Dec. 4, 1997. This disclosure is also related to the following U.S. Pat. No. 5,375,169, entitled "Cryptographic Key Management Method and Apparatus," which issued on Dec. 20, 1994 to SCHEIDT et al.; and U.S. Pat. No. 5,787,173, entitled "Cryptographic Key Management Method and Apparatus," which issued on Jul. 28, 1998 to SCHEIDT et al. This disclosure is further related to the following co-pending U.S. patent applications: Ser. No. 09/023,672 entitled "Cryptographic Key Split Combiner," which was filed on Feb. 13, 1998 by SCHEIDT et al.; Ser. No. 09/874,364, entitled "Cryptographic Key Split Combiner," which was filed on Jun. 6, 2001 by SCHEIDT et al.; Ser. No. 09/917,795, entitled "Cryptographic Key Split Combiner," which was filed on Jul. 31, 2001 by SCHEIDT et al.; Ser. No. 09/917,794, entitled "Cryptrgraphic Key Split Combiner," which was filed on Jul. 31, 2001 by SCHEIDT et al.; Ser. No. 09/917,802, entitled "Cryptographic Key Split Combiner," which was filed on Jul. 31, 2001 by SCHEIDT et al.; Ser. No. 09/917,807, entitled "Cryptographic Key Split Combiner," which was filed on Jul. 31, 2001 by SCHEIDT et al.; Ser. No. 09/992,529, entitled "Cryptographic Key Split Binder for User with Tagged Data Elements," which was filed on Nov. 20, 2001 by SCHEIDT et al.; Ser. No. 09/388,195, entitled "Encryption Process Including a Biometric Input," which was filed on Sep. 1, 1999 by SCHEIDT; Ser. No. 09/418,806, entitled "Cryptographic Information and Flow Control," which was filed on Oct. 15, 1999 by WACK et al.; Ser. No. 10/060,039, entitled "Multiple Factor-Based User Identification and Authentication," which was filed on Jan. 30, 2002 by SCHEIDT et al.; and Ser. No. 10/060,011, entitled "Multiple Level Access System," which was filed on Jan. 30, 2002 by SCHEIDT et al.

FIELD OF THE INVENTION

The present invention relates to systems that provide security and privacy for data. In particular, the present invention allows flexible access for authorized users of a communication system authorized while maintaining security for data at rest and in transit on the system.

BACKGROUND OF THE INVENTION

As an information security tool, cryptography can compliment changes in information technology. The growth of information systems has been phenomenal. However, today's cryptography and its key management have reached a crossroads as it attempts to adapt to the information system changes. The predominant public key management scheme of the 1980s and 1990s has shortcomings that will constrain the information industry from expanding into greater information sharing applications without a shift in public key application. A new direction in encryption is needed if the distributive enterprise solution, with its myriad information applications, is to be made effective.

By combining what has been learned in the implementations of public key management and pre-1980s key management, an expanded symmetrical core key management technology emerges as the better choice for bridging to the 21$^{st}$ century information applications that include data-at-rest and communications security models. Issues that confront future information protection models such as scalar, data separation, or role-based enforcement, system performance, and multiple enterprise authentication for the user or for the workstation can be satisfied by combining enterprise-wide information distribution with information control and access control capabilities while protecting the information.

An evolution in cryptographic technology is taking place. A symmetrical key management model that is particularly well suited for role-based access control systems that look to the roles users have within an organization, and to the information access that should be afforded those roles is being bound to an authentication key management model that incorporates the mathematical models of digital signatures and signed public certificates with physical properties of identification techniques as smart cards. The resultant key management technology is the basis for what will be referred to herein as Constructive Key Management (CKM).

In recent years, both government and industry have dramatically altered their perceptions of the development and expansion of information systems. The computer heralded the practical management of information. As its power and flexibility increased, the communications industry expanded its services and capabilities to accommodate the automated enterprise and its users. The rapid drop in prices and explosive development of both hardware and software compounded the computer's potential power.

Rapid growth is also evident in the conveyance of information on the software side. The entertainment world now produces games using terms like Virtual Reality and Cyberspace. This rapid advancement of information technologies has provided a somewhat uneven growth pattern, particularly in the sociological and legal arenas. Today, even the casual user has a headlong rush of information available at a level that did not exist ten years ago. We have moved from the radio-controller, to the microprocessor, and to today's multi-processor systems with complexities that even the most prescient PC gurus did not foresee. As we have become more familiar with the capabilities of our machinery, we have followed the most human of instincts: we attempt to share our discoveries.

The sharing of IDs has also extended to the sharing of workloads and the concept of distributive processing. The computer and communications communities responded to this demand. They have increased speed and provided connective opportunities enabling the booming of links, networks, LANs, WANs, and more and more acronyms that all mean "together." The result today is that any computer user, with a reasonable amount of equipment, can connect with just about any information application over the Internet. The age of the Internet and "information warfare" is upon us. The protection of selected information and selected channels of information has become a paramount concern in defense and commerce. While this evolution has been taking place in information processing, cryptography has emerged as a premier protection technology.

Keys are an essential part of all encryption schemes. Their management can be the most critical element of any cryptography-based security. The true effectiveness of key management is the ability for keys to be maintained and distributed secretly without penalizing system performance, costs, or user interaction. The management of the keys must be scalar, must be capable of separating information flow, must include interoperability needs, and must be capable of providing information control.

A method of distributing keys predominantly used in the 1980s and 1990s is public key, or asymmetrical, cryptography. In this method, the conversion of information to cipher text and the conversion of basic properties of the public key method include separate encryption and decryption keys, difficulty in deriving one key from another, secret decryption keys, and public encryption keys. The implementation of public key information encrypting keys is the result of the mathematical combination of the encryption and decryption keys. Public key management was developed for a communications channel requirement to establish cryptographic connectivity between two points, after which a symmetrical cryptogen such as DES was to be executed. Over the years, public key implementations have demonstrated their effectiveness to authenticate between two entities. However, to take the authentication process to a global certificate process has not been successfully done. Stated in other words, public key management is effective in an information model that defines point-to-point communications channels where the information encrypted does not need to be recovered.

Many of the recent implementations of public key management have left users with an option to create their own pair-wise connectivity within the network. This action can leave an organization vulnerable, and in some cases liable, if that user leaves the organization without identifying the keys that were previously used for encrypted files or data. Also, to assure the integrity of the public key from misuse, a third-party infrastructure scheme has surfaced, that is, a certificate authority process is created to mathematically confirm that a particular public key was issued to a specific user. The exchange of certificates with a third party can significantly impact the performance of a network. Further, this raises the legal issue of whether an organization should give a third party control over the validation of corporate correspondence.

A negative aspect of the public key process is a high computation time, which can impact the performance of an information application. In many instances, hardware solutions have compensated for the high computational requirements. Semi-public key architecture historically has been a point-to-point design; moving to a distributive network with group sharing of information can create higher transmission costs and greater network impact. Although the older key management systems of the 80's and 90's worked well for point-to-point communications and one-to-one file transfer, they are too time consuming to use in a case wherein a single file is placed on a file server and decrypted by thousands of users. As the trend toward work groups and complex communications infrastructures continues, the need for more efficient information and communications key management technology becomes paramount.

Shared secret keys or symmetrical key is the earliest key management design and pre-dates public key management. The earlier versions of symmetrical designs suffered what was referred to as the "n-squared" problem in that the number of keys needed was very large as a network expanded, and these designs did not have an effective authentication capability. However, symmetrical encryption has a measurably better system performance than public key implementations.

BRIEF SUMMARY OF THE INVENTION

The key management and distribution design of the present invention builds on the advantages, and takes into account the disadvantages, of both public and symmetrical key management implementations. Constructive Key Management (CKM) combines an encryption process based on split key capability with access control credentials and an authentication process based on public key and identification techniques. The binding method between the symmetrical and public key processes is itself an encryption sequence that ensures integrity to the parts of the processes.

Part of CKM is a split key symmetrical encryption technology. Split keys are key modules that when combined create the session key for the encryption/decryption process. As with all encryption key management processes, a certain portion of the process has to be pre-positioned. For example, the split keys that make up the Credential set must be distributed before a user (or a workstation) can initiate the encryption process.

Constructive Key Management is suited for role-based access designs that look to the roles users have within an organization, and to the information access that should be afforded those roles. Users' access permissions are changed as their roles within an organization change. As a symmetrical design, the cryptographic architecture model is closed to those users given split keys. A new user (or a workstation) would have to be given, through the process, a suite of split keys to participate in the encryption or decryption process. The CKM encryption process can be amended to data-at-rest such as files or information objects that are used in a store and forward and read later architecture, and the process can be part of the key exchange and the attribute exchange process for a transmission key management architecture.

Constructive Key Management integrates organizational information flow and control with an encryption key creation, distribution, combination, and authentication process. The design can support multiple symmetric key cryptogens or algorithms, and uses a data encryption process of combining split keys. These split keys are created by a Policy Manager for overall organizational distribution and managed through a credential manager to the user. Other administrative features are included in the key management process such as read and write authorization, identification fields, a user terminal field and an access import field for directory authentication. Additional administrative and security features can be realized with a hardware token such as a smart card. The internal Constructive Key Management design process can be used and adapted to various smart card implementations. For example, a 16 Kbit memory card may contain portions of the combiner process and the authentication process with the encryption process performed at the host. Additional memory and processor capability on the card offers further on-card encryption functionality and added authentication capabilities such as biometrics and card integrity techniques.

When a file or a transaction is encrypted using Constructive Key Management, a unique session key is created, used, and discarded. The session key cannot be derived from the file or message header. The (file) header contains the creator's identity and permissions (labels) indicating the audience of the file. The labels and algorithm form a matrix for separating access to information. The labels may be defined by the organization, or defined for a workstation's authority, or may be selected by a user. Upon receipt, the header is decrypted and the permission labels are compared to those of the recipient. If the comparison is favorable, other splits are obtained and combined, the session key is reconstructed, and the file is decrypted. If the focus was on protecting the information communications channel, a standardized split key exchange would be done to establish the channel (or tunnel) and to ensure encryption synchronization for maintaining the encrypted channel. Regardless of whether an object is encrypted or a channel is encrypted, no session or key split is transmitted with the information.

If necessary, an organization can recover all files since it controls the total label permission set and the corresponding key splits. Thus a private "recovery" capability is inherent within the symmetrical key management portion.

In addition to the variable key splits associated with the label permission process, other key splits used in the combining process that include a random split, an organization-unique key split, and a maintenance key split for periodic key updates. Each key split, as an entity, is combined with a non-linear function to offer a level of internal integrity to the cryptographic combining process. The resultant combination of key splits results in the session key used for the encryption and decryption processes.

CKM can be implemented completely in software, using a floppy disk as a token, or it can be implemented with a mix of hardware and software, using a smart card as a token. It can be implemented as a stand-alone encryption process, or it can be embedded into an information application. In summary, CKM encompasses a mix of symmetrical and public key management properties that can be used to encrypt objects or establish encrypted channels.

Constructive Key Management was designed to meet goals stated previously. The first level of Constructive Key Management meets the objectives of secrecy, that is, data confidentiality, access control, and user authentication. As a byproduct of the design, data separation and key recovery are available. The design of Constructive Key Management also gives it the functionality of a public key infrastructure. Adding public key cryptography to Constructive Key Management at the second level gives it the capability to meet the last three goals that are broadly termed authentication.

Constructive Key Management uses symmetric key cryptography for secrecy. Role-based access controls are implemented with the use of labeled splits that are combined to generate keys used in symmetric key cryptographic algorithms. Strong user authentication is realized with Constructive Key Management technology in the form of user passwords, biometric data, and tokens, such as a super card or other smart card. Data separation, through labeling and algorithm selection, provides functionality comparable to physical separation.

Constructive Key Management technology lends itself to data-at-rest that may be defined as objects that exist for some time, such as computer files, databases, e-mail messages, etc. However, Constructive Key Management is also suited for channel or pipeline transmitted data. Constructive Key Management technology can be extended beyond applications into lower levels of network protocol, for example, in IEEE 802 protocols or at level 2 in the OSI model of networking. The Constructive Key Management encryption protocol to establish the session key for the channel can be adapted to the parameters of the communications environment.

Constructive Key Management imposes a hierarchical infrastructure on an organization to securely manage splits. This infrastructure also gives Constructive Key Management the ability to distribute public keys, thus giving it the functionality of a public key infrastructure. The scalability of Constructive Key Management infrastructure is better than that of other proposed public key infrastructures, which require additional bandwidth over the network to exchange certificates and public keys. In Constructive Key Management, digital signatures and the Diffie-Hellman key exchange between the smart card and workstation are the principal forms of asymmetric key cryptography used. The Constructive Key Management infrastructure also gives Constructive Key Management the ability to implement a key recovery method. Flexibility in algorithm management means that strong symmetric key algorithms or exportable algorithms can be used.

Constructive Key Management technology meets a set of security objectives that provide the "classical" role of secrecy. First, data confidentiality keeps the content of information from being revealed to those who are not authorized to read it. This is realized in Constructive Key Management with symmetric key cryptography using a robust key management system that provides a new and unique key for each encryption with the user "selecting" the readership for the encrypted object. An object can be a file, a message, or some other defined entity.

Also, access control restricts use of encrypted objects to those entities specifically given permission to use them. Access control in Constructive Key Management is role-based; permissions are granted and revoked based on an entity's responsibility or position within an organization and not on who or what the entity is. It currently encompasses the actions of encryption and decryption but can include, for example, permissions to use certain programs, certain devices, or specific hardware operating raodes. Further, entity (or user) authentication establishes the identity of a user or other entity to the system. Entity authentication becomes stronger when other enhancements, to be discussed below, are added to Constructive Key Management.

Inherent in Constructive Key Management are the means to meet two additional, "modem", objectives. First, data separation gives the illusion that data at the same physical location, on a server or network wire for example, is physically separate. Two cryptographic means of separation are used in Constructive Key Management—separation by algorithm and separation by label. Also, key recovery in Constructive Key Management is the ability to regenerate the keys used to encrypt objects. Within any particular Constructive Key Management domain (or organization), encrypted objects are not lost with the loss of the entity that encrypted the object or the entity to which the encrypted object has been sent. But, at the same time, key recovery is an organized process requiring several deliberate events plus access to the encrypted object in order to regenerate the key and decrypt the object.

A digital signature offers Constructive Key Management the means to meet three additional, "conventional", security objectives. First, data origin authentication (also called message authentication) corroborates the source of Constructive Key Management encrypted information. Also, data integrity is the ability to prove that a Constructive Key Management encrypted object has not been altered since being encrypted and digitally signed. If digital signatures are not used, then a Message Authentication Code ("MAC") or Manipulation Detection Code ("MDC") with encryption can provide data integrity in Constructive Key Management. Further, non-repudiation proves that the signature on a signed object came from the signatory such that the signatory cannot deny having digitally signed the object.

DETAILED DESCRIPTION OF THE INVENTION

Figure 1:
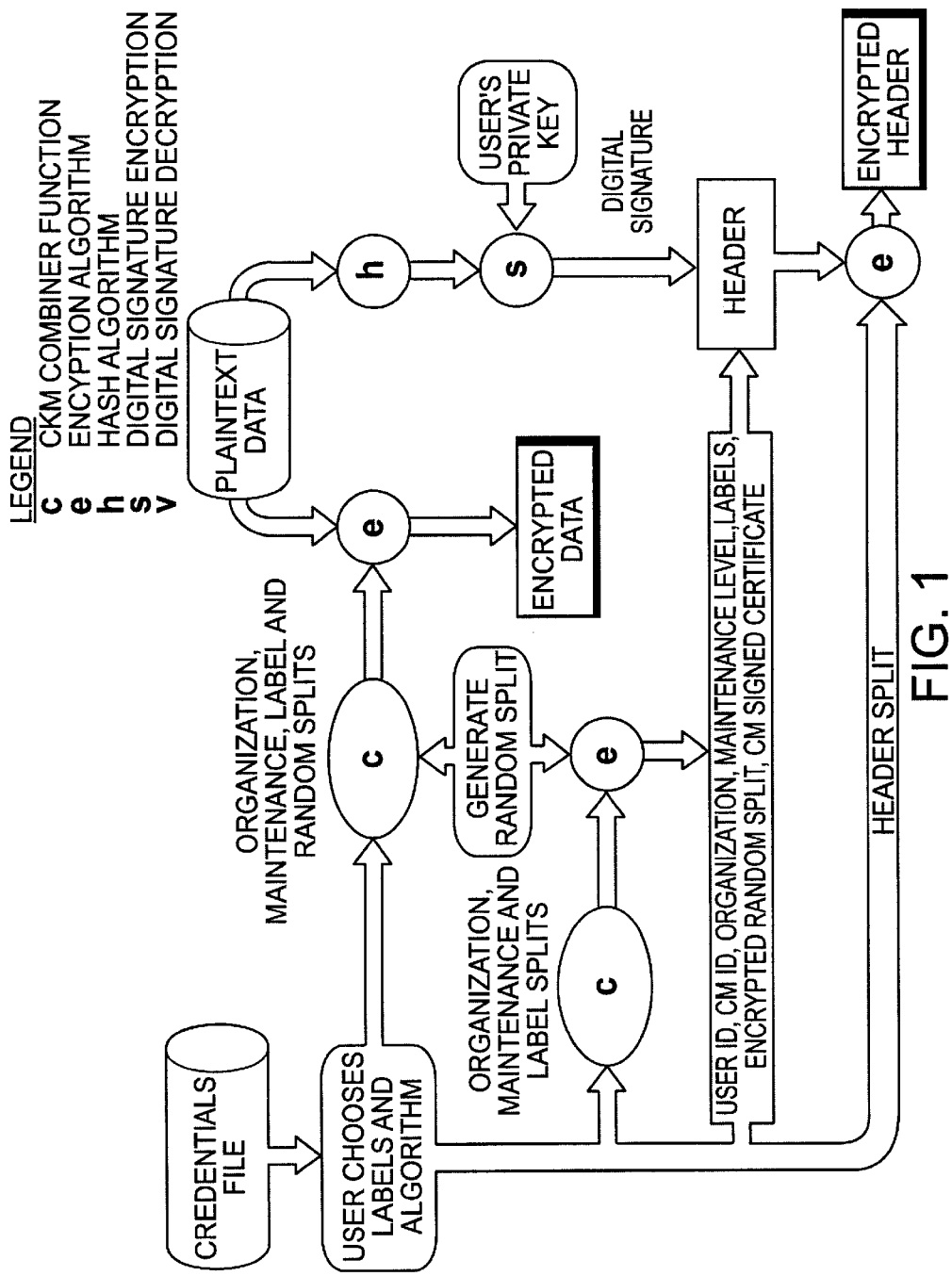
FIG. 1 a block diagram of encryption using a digital signature, according to the present invention.

The present invention is a cryptographic data security system and method (herein referred to as the "Constructive Key Management System", or simply "CKM"). The Constructive Key Management System is designed to achieve data security objectives, which include data confidentiality, access control, entity authentication, data separation, encryption key recovery, data origin authentication, data integrity, and non-repudiation. In order to accomplish these objectives, the Constructive Key Management System incorporates design aspects of both symmetrical key management techniques and public key (asymmetric) encryption technologies. In this manner, it provides encryption key management for both data-in-transit and data-at-rest. Significant components of the Constructive Key Management System can include split key encryption processes, intelligent tokens, biometrics, and digital signatures.

The Constructive Key Management System uses a multiple-tiered infrastructure to manage the secure distribution of information. This infrastructure also provides a method of user certificate and public key distribution for symmetric key cryptography so that digital signatures can be used. For example, one aspect of the invention focuses on functions used for encryption and decryption of objects. Another aspect of the invention focuses on authentication, and uses smart cards and, optionally, biometrics for entity authentication and digital signatures for message authentication. An additional aspect of the invention uses detection techniques for internally protecting the CKM authentication and encryption processes, which can be added if the environment indicates that this type of protection is necessary or desirable.

The first tier of the Constructive Key Management System is the Policy Manager. Primarily, the Policy Manager serves as the central authority for generating the encryption keys and managing the encryption algorithms used by a particular domain residing on a computer network. The encryption keys form the operational foundation of the Constructive Key Management System. In order to accomplish this task, the Policy Manager creates and assists in the management of key splits. These splits are random numbers that can be generated using hardware or through a software pseudorandom number generator. These random numbers have a 512-bit length and each is considered to be a single Key Split. Each Key Split is given a label and is combined with other Key Splits to produce the necessary encryption keys.

The second tier of the Constructive Key Management System is the Credential Manager process. This process accepts subsets of the Key Split labels created by the Policy Manager. In addition, the Credential Manager process accepts as input, subsets of encryption algorithms, organizational policies, and system parameters, which are managed by the Policy Manager. From this information, the Credential Manager assembles separate User Credentials for each user within a particular domain residing on a computer network. More particularly, the allocation of various combinations of Key Split labels to the users by the Credential Manager process allows the Constructive Key Management System as a whole to implement a system of access to information that is based on the roles maintained by users within an organization. Additionally, the Credential Manager includes a User Credentials database management system, a token management process, and a password distribution process.

A third tier of the Constructive Key Management System is the User Session, which performs the function of encrypting and decrypting objects for transmission through the computer network by individual users. In addition, a User Session performs user authentication by verifying passphrases, evaluating tokens, or interpreting biometrics. In a related aspect, a User Session may employ digital signatures for message authentication.

The Policy Manager program is used to initialize the operation of the Constructive Key Management System. The Police Manager assigns an Organization Name to the organization that is associated with a particular domain residing on a computer network. Once the Organization Name is assigned, the Policy Manager creates an associated Key Split identified as the Organizational Split. The Policy Manager also creates a separate Maintenance Split and a separate Header Encryption Split. In addition, the Policy Manager generates certain system parameters. These may include a modulus for a Diffie Hellman key exchange, identified as the Diffie-Hellman Modulus, or parameters for other digital signature schemes.

Next, the Policy Manager establishes categories for identifying sets of Key Split labels. A series of Key Splits is created and a label is associated with each Key Split and assigned a unique index number. Each label associated with a Key Split is then assigned to a category. Optionally, the Policy Manager can export a subset of the categories it established to a Policy Manager from another organization. Or, the Policy Manager may export a subset of the Key Split labels it created to a Policy Manager from another organization. Likewise, the Policy Manager can import a subset of the categories established by a Policy Manager from another organization. Or, the Policy Manager can import a subset of the Key Split labels created by a Policy Manager from another organization.

In addition to creating Key Splits, the Policy Manager assigns a name and a mode to each cryptographic algorithm to be used with the Constructive Key Management System. This name assignment process not only serves to hide the identity of the particular algorithm used for encryption, but also provides meaning to users who might be using a particular encryption algorithm for a particular purpose. Furthermore, the Policy Manager allows for the selection of policies in the use of the Constructive Key Management System. These include setting minimum password lengths, setting maximum User Credentials expiration times, locating User Credentials information, and defining system log attributes. It also includes selecting digital signature algorithms. Once the necessary policies are selected for a particular domain residing on a computer network, the Policy Manager distributes certain information to the Credential Manager process.

The information distributed by the Policy Manager program to the Credential Manager process includes a subset of the Key Split labels, a subset of the cryptographic algorithm names, and any limitations on the read and write permissions that the Credential Manager process assigns to users on the network. Prior to distribution, this information is assembled in a file and encrypted. Once encrypted, the file is transmitted to the Credential Manager; and, the decryption password for the encrypted file is transmitted to the Credential Manager using a separate secure channel. Periodically, the Policy Manager can establish new categories, associate labels with newly created Key Splits, or change policies. In these instances, the Policy Manager distributes the new information to the Credential Manager using the same encryption and transmission method. Also, periodically, the Policy Manager can update the Maintenance Split, which has the effect of updating all other system Key Splits. This update is accomplished so that all previously encrypted data can still be recovered. In addition, this Maintenance Split update revokes permissions for users who do not receive updated User Credentials from the Credential Manager. After updating the Maintenance Split, the Policy Manager distributes the new information to the Credential Manager using the encryption and transmission method previously described. In each instance where new information is distributed to the Credential Manager process, the Credential Manager implements additional update processes that affect the Constructive Key Management System.

Figure 6:
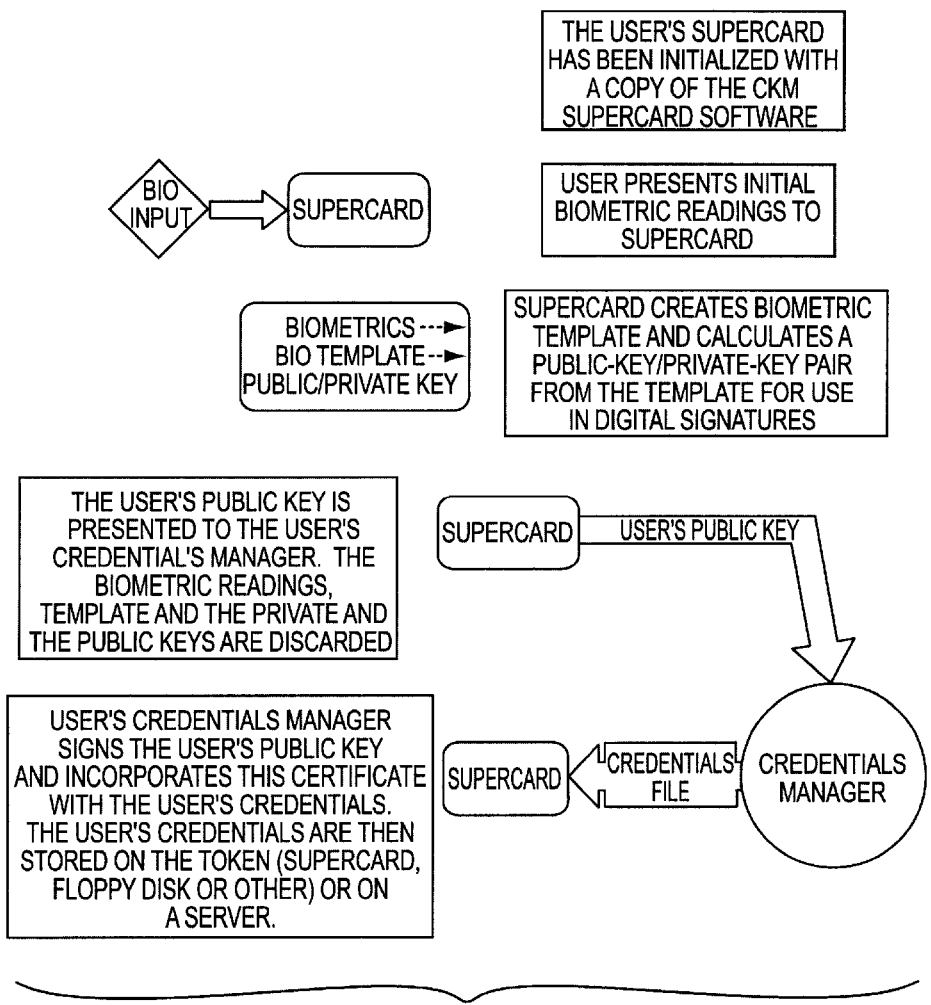
FIG. 6 is a block diagram of credentials initialization according to the present invention.

With reference to FIG. 6, the initialization of the Credential Manager process begins when an encrypted information file and the corresponding decryption password is received by the Credential Manager process. The Credential Manager process decrypts the encrypted information file with the corresponding decryption password.

The Credential Manager adds the users for which the Credential Manager has responsibility, to the Credential Manager programs database. Procedures or utilities that facilitate this process, such as creating a list of users from an e-mail address book, are provided in the Credential Manager software. For each user, the Credential Manager will decide what role that user has and assign labels and algorithms to that user that are appropriate for that role. Role templates and hierarchies aid this process.

If a smart card or other token is used, then for each user in the Credential Manager database, the Credential Manager will initialize a smart card with that user's ID. The card is then given to the user. An initial biometric reading is taken to establish the biometric template, which is entered onto the card. The software on the card will then generate a public/private key pair for use with a specific digital signature scheme. The private key is-unavailable to the Credential Manager.

For each user in the Credential Manager database, the Credential Manager software will accept a user's public key from that user's card. The Credential Manager software will record this public key in the database and then create a certificate with the Credential Manager's private key. It is preferable that the user is present at this step, or that a method is used to assure the user's identity.

The user's assigned permissions to labels and algorithms, the certificate created above, all Credential Manager public keys, policies, and system parameters are encrypted with a system-generated password. This assemblage constitutes the user's credentials. The credentials are stored on the user's card, or in a file on another type of token, or on a server. The card, along with the system-generated first use password, is given back to the user. Note that if the credentials are stored on a server, the user's credentials can be revoked at any time by erasing that user's credentials file from the server.

The user brings the card back to the workstation and logs in using the initial password. The Constructive Key Management software will prompt the user to change the initial password and other security features. Until this password is changed, the Constructive Key Management software will not continue. Utilities in the Credential Manager software facilitate ongoing maintenance, which include: issuing smart cards and credentials to new users, and reissuing the credentials file to a user, with a new first use password, whenever that user's credentials expire. Utilities in the Credential Manager software aid in recognizing when a user's credentials are about to expire. Not reissuing a user's credentials upon expiration will prevent that user from encrypting and decrypting data. This is another method of revoking a user's credentials.

The credentials are reissued to all users whenever the Policy Manager adds new labels and categories or whenever the Policy Manager has updated the Maintenance Split or whenever new labels and categories from another organization are added.

Except for the issuance of smart cards and credentials to new users, reissuance of credentials only requires the transfer of a first use password and new credentials file (if not stored on a server) to the users. The user does not have to be in the presence of the Credentials Manger again. Passwords can be distributed through an existing organizational administrative channel.

SMART CARDS/BIOMETRICS

Smart cards and biometrics provide greater integrity in meeting another objective: user authentication. A smart card can be an excellent hardware platform to adapt various levels of Constructive Key Management technology. The card can be a memory-only device, or it can be expanded to include processing capability. An advanced smart card for use with the Constructive Key Management system of the present invention shall be referred to herein as a super card. Along with its increased processing and memory, the Super Card includes a unique radio frequency signature and random number generation capability. Adding biometrics to Constructive Key Management enhances user authentication further and can provide a basis for the private key part of asymmetric key cryptography systems that Constructive Key Management uses for digital signatures.

USER SESSION ENCRYPTION

Constructive Key Management provides technology for generating and regenerating cryptographic keys and a method of managing those keys within an organization. Immediately before an object is encrypted or decrypted with Constructive Key Management, a cryptographic working key is generated. It is used to initialize a cryptographic algorithm for encryption or decryption, and then the working key is discarded.

The working key is built from many pieces of information. To be a participant in the system, a user must have the pieces necessary to build the working key; otherwise encryption and decryption cannot take place. A central authority, the Credential Manager, generates these pieces, which are called key splits in Constructive Key Management; a subset of these Key Splits is distributed to each user in the organization. The subset that each user receives is specific to that person and defines which labels that individual can use to encrypt (known as write permission in Constructive Key Management) and which labels that individual can use to decrypt (known as read permission). Several user authentication techniques are further used to verify a user to the Constructive Key Management system before that user is allowed to access information.

To build a key, a fixed system-wide split, called the Organization Split, and a variable system-wide split, called the Maintenance Split, are used. To this are added a random number, which is called the Random Split, and user-selected Label Splits. The Random Split provides a unique key that is necessary for security. User-selected Label Splits define the "readership" of the Constructive Key Management encrypted object, that is, which users will be able to decrypt the Constructive Key Management encrypted object. These Key Splits are provided to the Constructive Key Management Combiner Process that generates data used as the Working Key.

PASS-PHRASE VERIFICATION

Access to a user's credentials is controlled at the bottom tier of the Constructive Key Management hierarchy with a pass-phrase, initially assigned automatically by the Credential Manager. The pass-phrase is changed at the time of first use by the user and known only to the user. This provides rudimentary user authentication.

SMART CARD

Enhancements at the user level to provide stronger user authentication include a Smart Card—a processor and memory packaged into a plastic card, like a credit card—that can hold key pieces of information for user authentication. A smart card can provide additional security with its tamper resistance and hardware random number generation capability.

BIOMETRIC DATA

Another authentication enhancement is the use of biometric data. Biometric data is physiological or behavioral information associated with an individual that is unique to that individual and does not change appreciably during that individual's lifetime. Furthermore, it has to be something that can be digitized and entered into a computer. Biometric data can be used in the creation of private keys for digital signatures.

MAC and MDC

For data integrity alone, a Message Authentication Code (MAC) can be used. In such a case, instead of the generated key being used to initialize symmetric key algorithms, it is used to initialize a MAC. Manipulation Detection Codes (MDCs) can be used to provide data integrity and secrecy when combined with CKM encryption.

DATA ORIGIN AUTHENTICATION/NON REPUDIATION

If data origin authentication and non-repudiation are required, the Constructive Key Management infrastructure is then used to provide the capability to distribute public keys that give Constructive Key Management the ability to use cryptographic bound digital signatures. Digital signatures provide data integrity, data origin authentication, and user non-repudiation. If a digital signature is used, MACs or MDCs are not required. Combining digital signatures with core Constructive Key Management establishes the means for meeting all of the objectives of this invention.

SUPER CARD

The Super Card is a smart card with enhanced processing ability, has greater memory than current smart cards and includes tamper resistance and random number generation. The processing capability of the card may reduce Constructive Key Management task processing on the workstation. In addition, local processing within the card increases the workload of an adversary who is trying to snoop the internal workings of Constructive Key Management processes in order to gain information about secret keys. Larger memory within the card makes it possible to store user credential files and "private" Constructive Key Management applications. This contributes to the security of the Constructive Key Management system.

The communication between the Super Card and the workstation is encrypted. The Super Card stores a public key/private key air generated internally by the card. This is done when the Super Card is initialized with the Constructive Key Management software that the Super Card runs internally. This key pair is used in a Diffie-Hillman key exchange between the Super Card and the workstation. This contributes to the security of the Constructive Key Management system by not allowing an adversary to snoop passwords and keys being exchanged between the card and the workstation.

An inherently random radio frequency signature, called Resonant Signature-Radio Frequency Identification (RS-RFID), which is provided by a taggant embedded within the card, aids tamper resistance. The RS-RFID of the card is encrypted with a key based on the user's ID and password, some ephemeral information, and possibly biometric information. This encrypted value is stored in the User's Credential file. Any tampering with the card will change the RS-RFID of that card. When a damaged RS-RFID is used, the wrong radio signature is read and will not match the decrypted value in the user's credentials file. The card reader that reads the Super Card includes hardware to read the RS-RFID.

Another feature of the Super Card is hardware random number generation capability. As will be shown below, random numbers are used by Constructive Key Management for object encryption, as well as for other operations. In the absence of the hardware random number generation, Constructive Key Management uses a software pseudorandom number generator for the random numbers. Using a hardware source provides much better random number generation and contributes to the strength of the overall security of the Constructive Key Management system.

BIOMETRIC DATA

In general, biometric data as digitized from an analog biometric input device is variable to a small extent. The process of using a biometric device can be as follows: Initially, a biometric reading is taken, digitized, possibly mathematically transformed, and then stored as a template. Subsequent biometric readings are manipulated in the same way and compared to this template using some tolerance value. Tolerance values are different for different types of biometric data.

If it is assumed that the template stores data of several parameters, then in matching biometric readings to the parameters the tolerance value provides a threshold for deciding if a match is successful. The continuum of values for a parameter is partitioned by the tolerance value for that parameter, into discreet quanta. When a biometric reading is taken, we can now associate the value of the quantum that the measurement falls in with the value to be used for that biometric reading. In general, however, that value might not match the quantum value stored in the template. Assuming the measurements are normally distributed and the tolerance value covers three standard deviations on either side, a correct biometric reading should fall in the same quantum as that of the template or the quantum next to it. Therefore, an exact quantity can be generated from biometric data to be used as a constant in cryptographic processes.

It is desirable not to store a biometric reading, and this includes the template, even if it is encrypted. Using the technique above, a template value would be used but is not stored anywhere. To reconstruct the template, a biometric reading is taken, candidate values are formed, and each candidate is used as a key to decrypt some data until one of these values matches. If a match can be found, then the user has been authenticated and this matching value is the template value to be used as a constant elsewhere in the Constructive Key Management process. If a match cannot be made, the user has not been authenticated, and the authentication process can be repeated or the authentication for that user fails.

DIGITAL SIGNATURES/MAC+MDC

Digital signatures are used in Constructive Key Management to provide data origin authentication, data integrity, and non-repudiation. The infrastructure provided by Constructive Key Management supports a form of a public key infrastructure (PKI) that distributes signed certificates and public keys that are used in digital signature verification. In other proposed public key systems, the certificate authority takes the form of a database on a server that users query via a network. In Constructive Key Management, Credential Managers play the part of a certificate authority. All information for verifying digital signatures in Constructive Key Management is provided in a user's credentials and encrypted objects. Additional bandwidth from the network is therefore not required as it is in other public key infrastructures.

The certificate for a user is generated by that user's Credential Manager. Each Credential Manager has its own public and private key. The public keys of all of the organization's Credential Managers are provided in each user's credentials. The Credential Manager encrypts a user's ID and public key combination with the Credential Manager's private key. This is the basic certificate.

A user's certificate is contained in that user's credentials so that it can be sent with Constructive Key Management objects that the user has signed. The recipient of a Constructive Key Management object uses the Credential Manager's public key to decrypt the sender's certificate and recovers that user's public key. The sender's public key is used to verify the digital signature on that Constructive Key Management object.

In Constructive Key Management, a user's biometric template forms the basis of a user's private key. For example, in the El Gamal Signature Scheme, a public key is the combination of a prime number, p, a primitive element, $\alpha$, and a value, $\beta$, computed from a private number a. This private number is usually picked at random. However, in Constructive Key Management, the user's biometric template could become this private number.

To verify a digital signature, the certificate is decrypted using the corresponding Credential Manager's public key that is found in credentials. This exposes the signatory's public key, which is then used to verify the digital signature.

If privacy and data integrity without regard to data origin authentication and nonrepudiation are desired, an MDC combined with Constructive Key Management encryption may be used. An MDC is basically an "unkeyed" hash function that is computed from the message. This hash is then appended to the message, and the new message is encrypted.

For verification of data integrity, a recipient decrypts the message, separates the hash from the message, computes the MDC of the recovered message, and compares this to the decrypted hash. The message is accepted as authentic if the values match.

If only data integrity without regard to privacy is needed, a AAC can be used with Constructive Key Management. The working key for the MAC is constructed in the same way as that for the key used for encrypting a message for privacy, viz., by using the Constructive Key Management combiner process with Label Splits, Organization Split, Maintenance Split, and a Random Split.

To verify data integrity, the recipient of the MACed message uses the splits associated with the message to rebuild the key for the MAC. A new MAC is then calculated by the recipient and compared to the MAC sent with the message. If the two MACs match, the message is accepted as having been the original message and not having been tampered with.

The access a user has to Constructive Key Management objects is granted by that user's Credential Manager. Because access is based on organization-generated labels, role-based access is possible. This simplifies the management of granting, changing, and revoking access to individuals.

Establishing a session with the Constructive Key Management System is contingent upon a successful logon and decryption of user credentials. A correct user ID, password, the correct smart card, and user biometric will successfully decrypt the credentials file thus authenticating that user to the Constructive Key Management System. An incorrect User Identification, User Password, a smart card not belonging to the user, or the biometric of another will not decrypt the credentials file.

At the conclusion of the initial issuance of user credentials with the smart card: a random number has been generated and stored on the card. This random number serves as the swing point for the authentication process. The user's credentials are stored either on a token, the user's workstation, or a server. The credentials are encrypted using a key based on a password and the user's biometric template.

Figure 3:
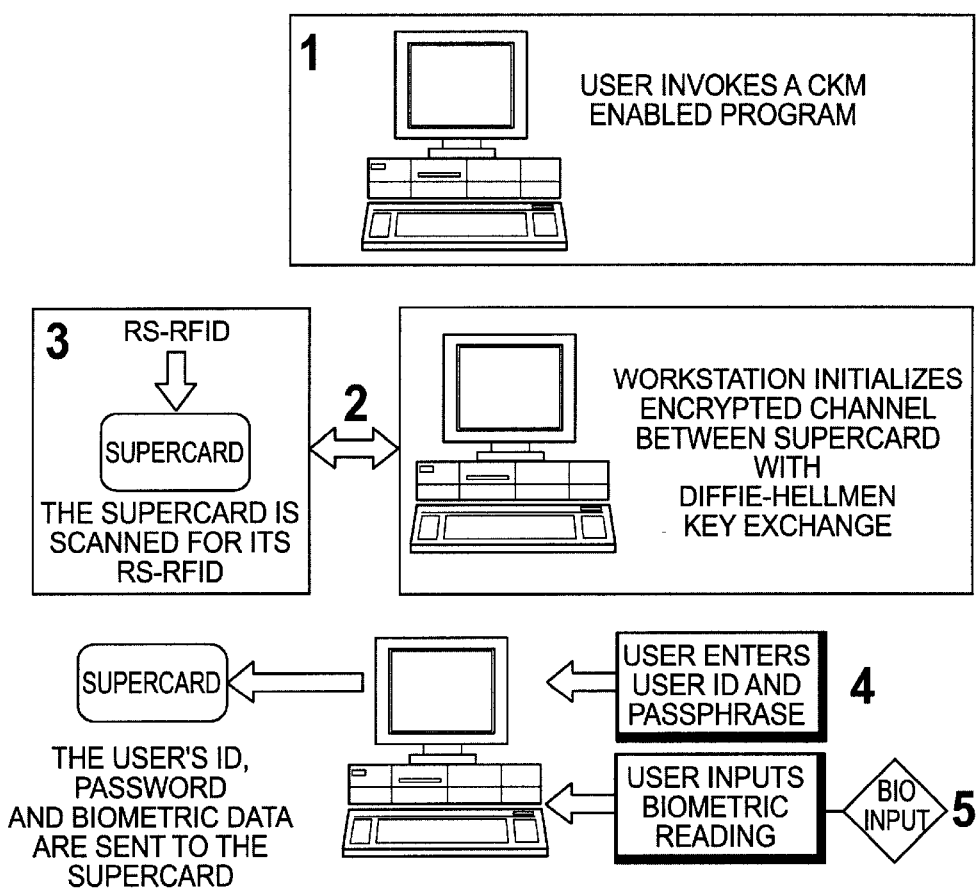
FIG. 3 is a block diagram of first actions in a process of user session establishment according to the present invention.
Figure 4:
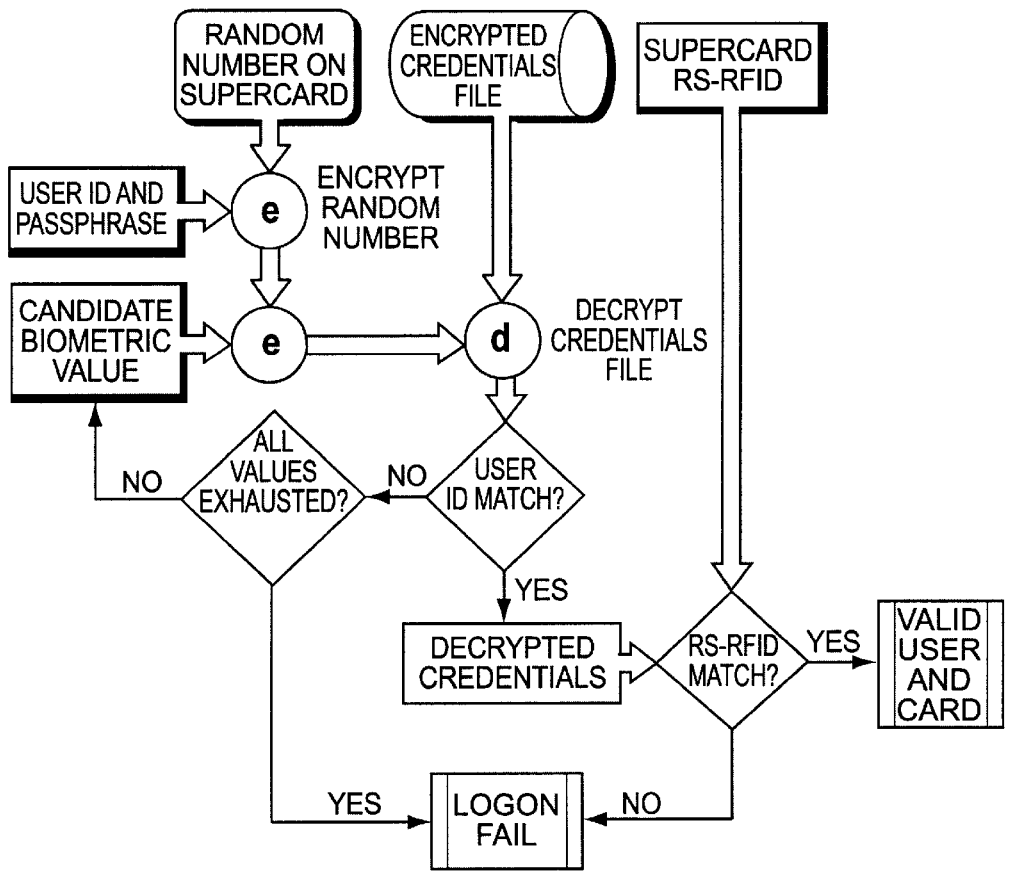
FIG. 4 is a block diagram of second actions in a process of user session establishment according to the present invention.
Figure 5:
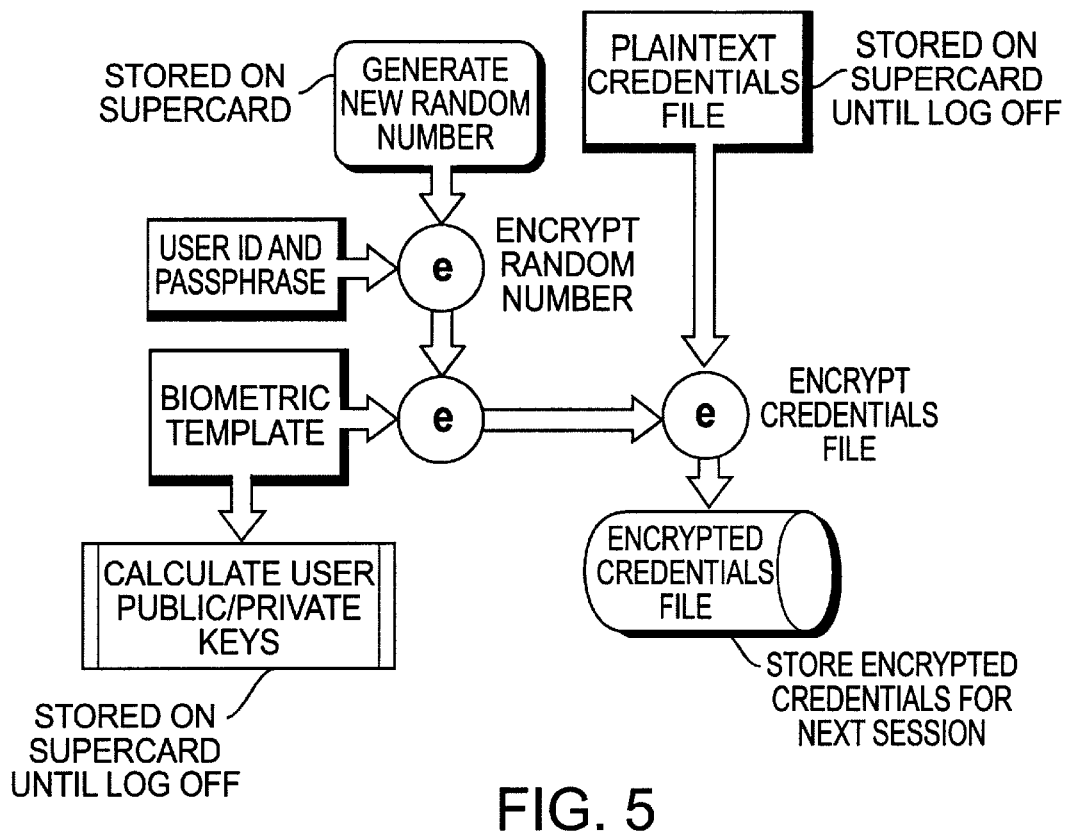
FIG. 5 is a block diagram of third actions in a process of user session establishment according to the present invention.

With reference to FIGS. 3–5, the logon process is performed as follows: The user runs a Constructive Key Management-enabled program. The workstation has established its own public/private key pair for use with Diffie-Hellman key exchange upon installation of the Constructive Key Management software. A communication channel is initialized for the smart card, preferably using the ANSI X9.42 Diffie-Hellman dhMQV2 protocol. The workstation's and the card's public keys are exchanged and ephemeral information is exchanged. A random number is generated and exchanged using the key already established to encrypt this value. This random number then becomes the session key used to encrypt the data sent to and from the workstation and the smart card. Note that this protocol is utilized between the smart card and the workstation. Because a standard card reader can be used, no intelligence on the reader is required. However, if a Super Card as described above is used, the reader will need extra hardware to read the RS-RFID signature from the card. In addition, the random number will be generated on the card.

The program invokes a Constructive Key Management session logon screen where the user presents a User ID and User Password. The User ID and User Password are communicated to the smart card.

The Constructive Key Management program prompts the user for the user's biometric information. The biometric information is read into the workstation and then sent to the card.

The card reader reads the Super Card's RS-RFID, and sends this to the card.

The card uses the User ID and User Password to encrypt the random number stored on the card and then uses candidate biometric data to encrypt this value. This candidate value is used as a key to decrypt the user's credentials. Upon successful decryption, the User ID stored in the credentials file and the one presented by the user match.

The RS-RFID read from the card is compared with that encrypted in the user's credentials. If there is a match, then the Super Card is accepted as not having been tampered with.

Once logged on, the user will stay logged on as long as a Constructive Key Management program is actively being used and while the card remains in the reader. There is an inactivity time out set by the Credential Manager, beyond which if the user does not actively use a Constructive Key Management program, the Constructive Key Management session is disabled. And the user must again present a password and possibly the biometric information and Super Card (or smart card), to resume using Constructive Key Management-enabled software. When a user quits a Constructive Key Management session, and there are no other Constructive Key Management sessions running at that time, the user may log off or continue to stay logged on until the time out period. Within this time out period, if another Constructive Key Management-enabled program is invoked, the user does not have to log on. If, however, the time out period has lapsed, the user will have to log on yet again to resume a session. During this period when no Constructive Key Management-enabled program is running, and before the time out has expired, the user may run a utility program that will quickly log that user off.

The process outlined above establishes user authentication. Three elements are needed: the User's Password (something known), the user's biometric data (something inherent), and the Super Card or other type of token (something owned). Without a password, an adversary needs to guess or search the whole password space. A random number is used as a start for the process so that if password guessing were used the output could not so easily be detected as correct. Changing this number continually prevents an adversary from bypassing the process by watching what the result is and then "replaying" this result. Password policies, such as establishing a minimum number of characters required in a password, also help, but passwords alone are still considered weak authentication.

For "strong" authentication, biometrics and a token are also needed. Adding biometrics adds another piece of information that is needed to start a Constructive Key Management session. Note that in Constructive Key management, the biometric template is not stored anywhere and so cannot be recovered without the user's biometric input. Knowledge of a user's password does not give away that user's biometric template. Conversely, knowledge of a user's password does not give away that user's password. If a user's credentials are lost, candidate values taken from a biometric reading would not be able to establish the original template. However, since the template is used as the basis for a user's private key for digital signatures, the candidate values can be used to generate public keys which can be compared to the public keys stored by the user's Credential Manager to establish once again the user's original template value.

Key pieces of information are stored on a token, such as a Super Card. This token is needed to complete logon. In addition tampering with a Super Card will destroy the inherent RS-RFID signature and this would be detected. Compromise of the token does not give away either a user's password or biometrics. A lost token is replaceable by the user's Credential Manager.

With reference to FIG. 1, encryption of an object in Constructive Key Management requires the choice of a cryptographic algorithm and a set of Key Splits that will be used to supply data needed to construct an encryption key and will determine who will be able to decrypt the encrypted object. A provided feature is default label and algorithm selection so that the user does not always have to physically make this choice. The label and algorithms that the user has permission to use are taken from the user's credentials. Within the user's credentials file are the splits, and the labels associated with them, that the user can use to encrypt an object. The user must have write permission on those labels in order to encrypt. The user's Credential Manager has granted those permissions when the credentials file was issued to that user. The selection of labels and algorithms and their respective permissions is how data separation is accomplished in Constructive Key Management.

The labels are grouped into categories. In general, the user encrypting an object will choose one label from each of the categories. In order for someone to be able to reconstruct the key to decrypt that object, a user will need read permissions from his or her credentials file, for every one of the labels used in the encryption process of that object.

While the user is logged on, and an encrypted channel between the workstation and Super Card with full authentication is established, the Constructive Key Management encryption process is performed as follows: Constructive Key Management software presents a dialog box to the user for selection of labels and algorithms. The label selections are sent to the Super Card. The workstation applies a cryptographic hash algorithm to the object. This is sent to the Super Card. The Super Card generates a 512-bit random number, that is, the Random Split. New Random Splits are generated for each object to be encrypted. All random numbers generated are tested for randomness according to FIPS 140-1. The Organization Split, Maintenance Split, Label Splits, and the Random Split are combined in the Constructive Key Management combiner process, which results in a 512-bit Working Split. This Working Split is used like a session key for encrypting one object. The Organization Split, Maintenance Split, and Label Splits are combined in the Constructive Key Management combiner process. This results in a 512-bit integer that is used to encrypt the Random Split that will appear in the Constructive Key Management header. The Super Card encrypts the hash of the object with a digital signature algorithm using the user's private key. This results in a Digital Signature. The Digital Signature, Credential Manager Signed Certificate, Label Indexes, Algorithm, encrypted Random Split, and Working Split are sent to the workstation. The workstation encrypts the object using the algorithm selected with the Working Split as the Working Key. The workstation forms the Constructive Key Management Header. The Constructive Key Management Header contains all of the information needed to decrypt the object and verify the digital signature except for the Label Split values and Credential Manager's public keys. The data in the Constructive Key Management Header includes: Organization Name, Label Indexes, Algorithm, Encrypted Random Split, User Identification, User's Credential Manager Identification, Object Encryption Date, Object Encryption Time, Object Digital Signature, Credential Manager Signed Certificate, and other information that might be specific to the object that was encrypted. For example, this information could include file name and attributes if the object that was encrypted was a file.

The Constructive Key Management Header is sent to the Super Card, where it is encrypted with the Header Split used as the key.

The encrypted Constructive Key Management header is sent back to the workstation where it is added to the encrypted object.

Figure 2:
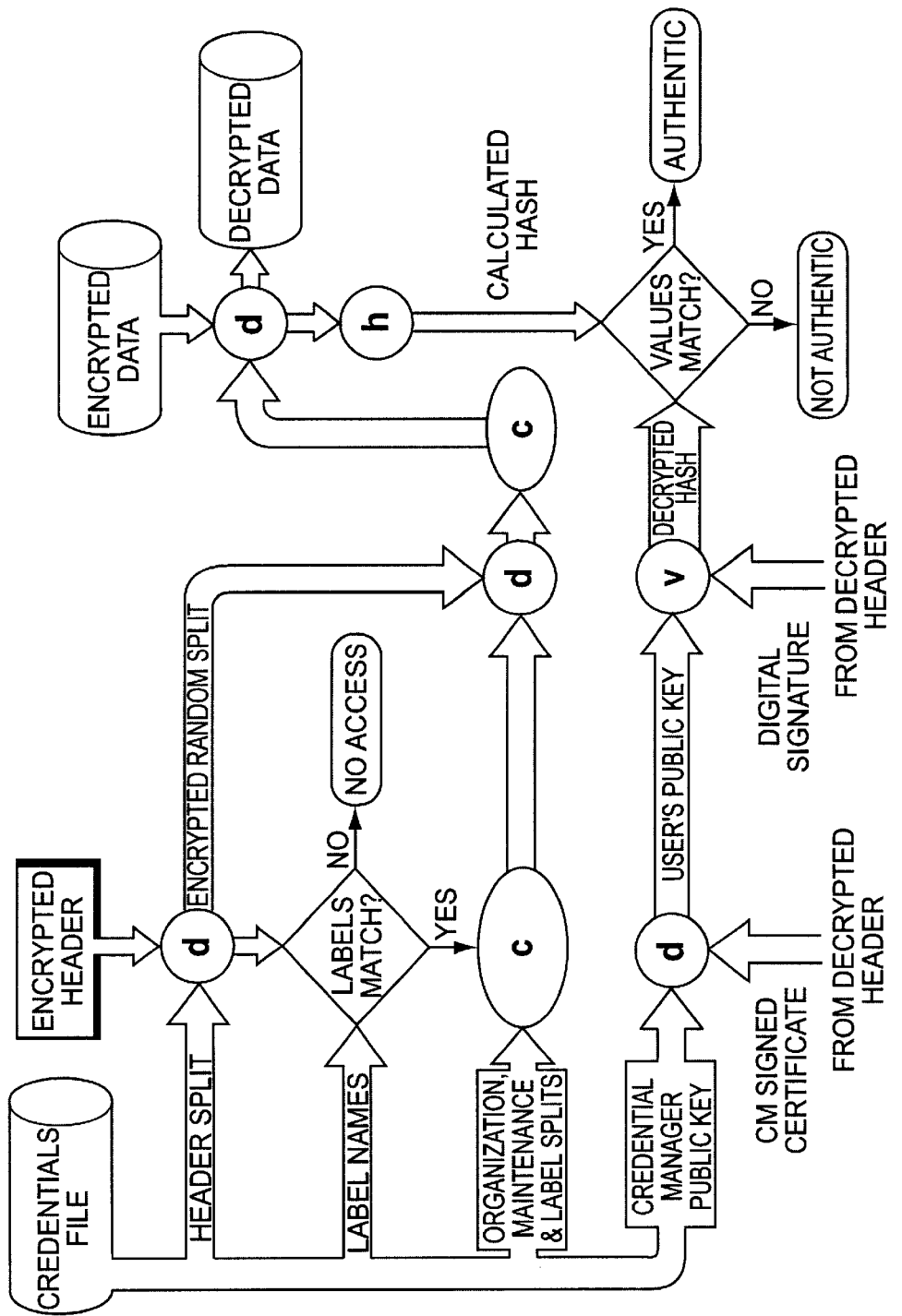
FIG. 2 is a block diagram of decryption with digital signature verification, according to the present invention.

With reference to FIG. 2, the Constructive Key Management decryption process is performed as follows:

The Constructive Key Management Header is transmitted to the Super Card, where it is decrypted with the Header Split, recovering the Digital Signature and the information necessary to verify it and the Label Set Indexes that were used to encrypt the object.

The Label Set Indexes and Algorithms are checked against the user's credentials, and if the user has permission to decrypt the object, the process continues. Otherwise, a failure message is sent to the workstation and decryption is denied.

The Super Card uses the Label Splits and Organization Split to recover the Random Split The combiner function in the Super Card is invoked with the Random Split, Label Splits, Maintenance Split, and Organization Split to reconstruct the Working Split. The Working Split and Algorithm are sent to the workstation.

The object is decrypted at the workstating with the algorithm and Working Split.

A hash of the decrypted object is calculated on the workstation and sent to the Super Card.

The Super Card looks up the Credential Manager's public key from the user's credentials and decrypts the Credential Manager Signed Certificate to recover the signatory's public key and ID.

The signatory's ID is compared with that from the Constructive Key Management header. A non-match is a failure.

The signatory's public key is used to decrypt the hash value from the Constructive Key Management header.

The hash value from above is compared to the decrypted hash value from the Constructive Key Management header. If they match, then the digital signature has been verified.

Notice that the splits associated with the labels that are used as the basis for the Working Key are not in the Constructive Key Management header. Only pointers to those splits are in the header; the actual split values themselves are stored in the user's credentials file, that is, they are secret. The Random Split is in the header but is encrypted using the Label Splits to generate the key for this encryption. The inclusion of the Random Split and the process used to build the Working Key means that the Working Key is random. Because Random Splits are generated for every encryption, the Working Split is never the same even if the same labels are used. The secrecy and randomness of the Working Key and the limited amount of text encrypted with that key all contribute to the confidentiality of the object being encrypted.

The strength of the cryptographic algorithms used also adds to the confidentiality of encrypted objects. The algorithms used in Constructive Key Management are commercially available cryptographic algorithms. Flexibility in choosing algorithms means that exportable algorithms may be used with Constructive Key Management.

The Constructive Key Management Combiner Process is a non-linear function of several inputs with the output being a 512-bit value. The combiner can operate on the Super Card to keep adversaries from snooping the process. Also as an aid to thwart adversaries, the communications channel from the card to the workstation is encrypted.

Thus, Constructive Key Management uses symmetric key cryptography to provide secrecy. Role-based access controls are implemented by using labeled splits that are combined to generate the keys used in symmetric key cryptographic algorithms. Strong user authentication is realized with CKM technology in the form of user passwords, biometric data, and tokens, such as super cards. Data separation, with labeling and algorithm selection, provides functionality comparable to physical separation.

What is claimed is:

1. A process of securing an object, comprising:
    applying a cryptographic hash algorithm to the object to provide a hash value;
    storing the hash value on a token;
    generating a random key component;
    combining a first plurality of key components to form a first key;
    encrypting the object using the first key;
    combining a second plurality of key components to form a second key;
    encrypting the random key component using the second key to form an encrypted key component;
    encrypting the hash value according to a digital signature algorithm using a user private key, to provide a digital signature;
    encrypting the hash value according to a user algorithm using the first key;
    forming a header including information that can be used to decrypt the encrypted object, wherein the information includes the user algorithm, the encrypted key component, and decrypt read credentials;
    encrypting the header; and
    adding the encrypted header to the encrypted object;
    wherein the first plurality of key components includes the random key component, and the second plurality of key components does not include the random key component.

2. The process of claim 1, wherein the user algorithm is selected from among a plurality of user algorithms.

3. The process of claim 1, wherein the first plurality of key components includes a fixed organization key component.

4. The process of claim 1, wherein the first plurality of key components includes a variable maintenance key component.

5. The process of claim 1, further comprising:
    selecting at least one permission instance from a plurality of permission instances;
    wherein the first plurality of key components includes a label key component corresponding to the at least one selected permission instance.

6. The process of claim 1, wherein the random key component is generated on the token.

7. The process of claim 1, wherein the header is encrypted on the token.

8. The process of claim 5, wherein the second plurality of key components includes a fixed organization key component, a variable maintenance key component, and the label key component.

9. The process of claim 5, wherein the header further includes the encrypted key component, the at least one selected permission instance, and the digital signature.

10. A process of decrypting an object secured according to the process of claim 1, comprising:

decrypting the header to recover the information that can be used to decrypt the encrypted object, wherein the information includes the encrypted key component, the user algorithm, and the decrypt read credentials;

checking at least some of the information that can be used to decrypt the encrypted object against the decrypt read credentials;

using the second plurality of key components to recover the random key component;

using the first plurality of key components to recover the first key; and decrypting the encrypted object using the algorithm and the first key.

\* \* \* \* \*